United States Patent [19]

Smith

[11] 4,222,705

[45] Sep. 16, 1980

[54] BEARING MOUNTING WITH COOLING MEANS

[75] Inventor: Raymond Smith, Monclova, Ohio

[73] Assignee: Teledyne Industries, Inc., Los Angeles, Calif.

[21] Appl. No.: 21,797

[22] Filed: Mar. 19, 1979

[51] Int. Cl.³ .............................................. F01D 5/08
[52] U.S. Cl. .................................... 415/114; 415/180; 308/77; 308/189 R
[58] Field of Search ............... 415/114, 180, 175, 177; 308/189 R, 77, 190, 207 R

[56] References Cited

U.S. PATENT DOCUMENTS

| | | | |
|---|---|---|---|
| 3,630,582 | 12/1971 | Maire | 308/77 |
| 3,645,593 | 2/1972 | Irwin | 308/189 R |
| 3,753,463 | 8/1973 | Segelken et al. | 308/77 |
| 3,909,085 | 9/1975 | Wilkinson et al. | 308/189 R |

Primary Examiner—Lenard A. Footland
Attorney, Agent, or Firm—Gifford, VanOphem, Sheridan & Sprinkle

[57] ABSTRACT

A bearing mounting with cooling means is provided which is particularly suited for use in turbine engines. The device comprises a housing coaxially connected to a rotating shaft while a bearing is operatively disposed between a relatively stationary member and one end of the housing. A heat sink, which can comprise one or more stages of compressor for the turbine engine, is connected to the other end of the housing. An annular fluid chamber is formed axially along the housing between its ends and tapers radially outwardly from the second end and to the first end of the housing. The annular chamber is partially filled with a heat conductive liquid. Heat energy from the bearing is conducted to the liquid which vaporizes and expands toward the second end of the housing whereupon the heated gas transfers its heat energy to the heat sink and recondenses. The recondensed liquid is then returned by centrifugal force to the first end of the housing.

12 Claims, 4 Drawing Figures

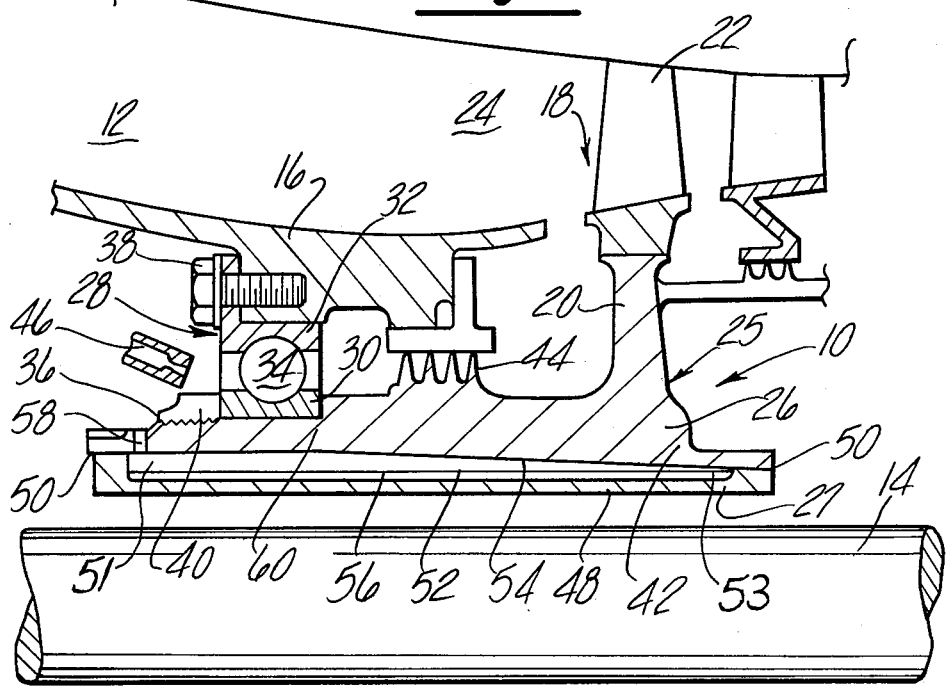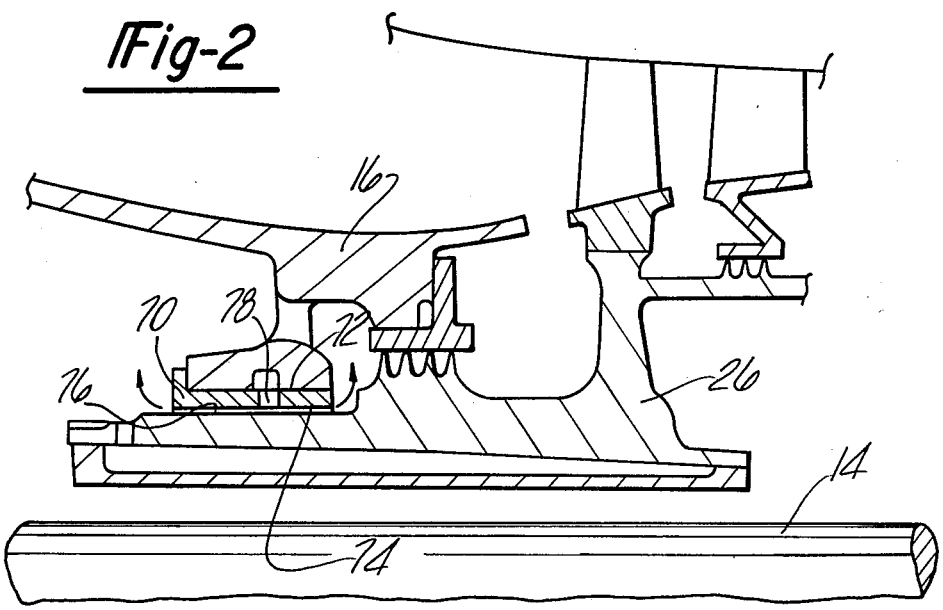

BEARING MOUNTING WITH COOLING MEANS

BACKGROUND OF THE INVENTION

I. Field of the Invention

The present invention relates generally to a mounting for a bearing means and, more particularly, to such a mounting with cooling means.

II. Description of the Prior Art

During operation, all bearing assemblies generate heat from friction which often must be dissipated in order to stabilize the operating temperature of the bearing assembly at a level compatible with both the bearing assembly and also with the lubricant used for the bearing assembly. Adequate heat dissipation from the bearing assembly is particularly critical for turbine engine bearing assemblies which must operate at high rotational speeds for relatively long periods of time without bearing failure or seizure.

A number of methods and construction have been previously employed for dissipating the heat created by bearing operation. These previously known methods have, for example, included pumping oil through the bearing assembly so that the bearing heat is transferred to the oil. The oil is then returned to a reservoir whereupon the oil dissipates its heat in any of a number of fashions afterwhich the oil is recirculated through the bearing assembly and the process is repeated.

This previously known method of cooling the bearing assembly, however, is disadvantageous in several different respects. First, the bearing cooling means must of necessity include a lubricant pump for circulating the lubricant through the bearing assembly. Such lubricant pumps, however, are not only costly in construction but are also prone to failure which typically renders the entire bearing operating system inoperable.

A still further disadvantage of these previously known bearing lubrication systems is that the lubrication system itself is not only bulky and space consuming but is also relatively heavy in weight. Space and weight considerations are particularly critical when the bearing assembly lubrication system is employed in a turbine engine where design criteria require minimization of both weight and bulk.

SUMMARY OF THE PRESENT INVENTION

The present invention overcomes all of the above mentioned disadvantages of the previously known bearing lubrication systems by providing such a system particularly adapted for use in a turbine engine and which is compact, light weight and inexpensive in construction.

In brief, the present invention comprises a mounting for a bearing means having an elongated housing coaxially connected to a rotating shaft for rotation therewith. The bearing assembly to be cooled is operatively connected between one end of the housing and a relatively stationary member. A heat sink is connected to the other end of the housing and thus is axially spaced from the bearing assembly.

A fluid passage means, preferably comprising an annular fluid chamber, extends between the ends of the housing and tapers radially outwardly from the second end of the housing, i.e. adjacent the heat sink, toward the first end of the housing, i.e. adjacent the bearing assembly. The fluid passageway is partially filled with a heat conductive liquid such as water, fluorinated hydrocarbon (Freon), ethylene glycol or the like.

In operation, the rotation of the housing with the rotating shaft centrifugally forces or pumps the liquid toward the first end of the housing due to the outward taper of the fluid passageway. Heat from the bearing assembly is conducted to the liquid which absorbs the heat energy, vaporizes and expands toward the relatively cool, second end of the fluid passageway. As the heated gas impinges upon the second end of the fluid passageway, the gas transfers its heat energy to the heat sink which dissipates the heat from the bearing assembly. In doing so, the gas cools and recondenses and is again pumped toward the first end of the housing by centrifugal force.

In the preferred form of the invention, the bearing assembly is employed in a turbine engine and one or more compressor stages of the turbine engine form the heat sink. With this construction, the bearing heat is conducted along the compressor disc to the compressor blades and dissipated by convection in the compressor air flow path.

As will become hereinafter more clearly apparent, the device according to the present invention is compact, light weight and relatively inexpensive in construction. Moreover, when used in a turbine engine, the already existing compressor stage or stages are employed as the heat sink, thus obviating the need for auxiliary or additional heat sinks.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1 is a fragmentary sectional view illustrating the device according to the present invention;

FIG. 2 is a fragmentary sectional view similar to FIG. 1 but showing a modification thereof;

DETAILED DESCRIPTION OF THE PRESENT INVENTION

Figure 3:
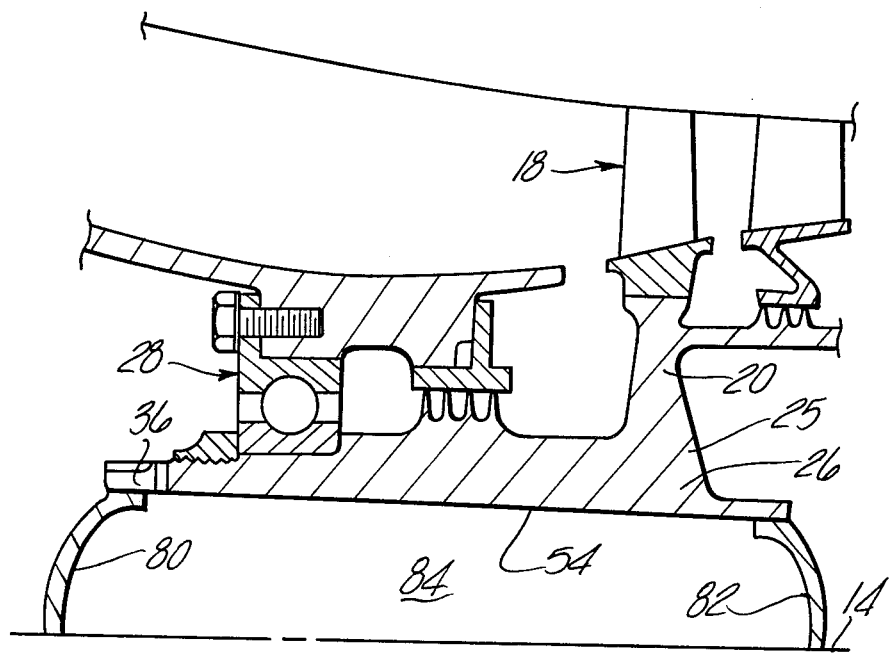
FIG. 3 is a fragmentary sectional view similar to both FIGS. 1 and 2 but showing still a further modification thereof.

With reference now to FIG. 1, the bearing mounting with cooling means 10 according to the present invention is there-shown in use in a turbine engine 12. The turbine engine 12 includes a first turbine expander (not shown) which rotatably drives a compressor 18 while a second turbine expander (not shown) rotatably drives a second main shaft 14 which is rotatably mounted in a turbine engine support housing 16. The turbine engine compressor 18 further includes a compressor disc 20 having a plurality of circumferentially spaced compressor blades 22 (only one of which is shown) secured about its outer periphery. The compressor blades 22 are positioned within the compressor air flow path 24 in the turbine support housing 16.

The bearing mounting 10 generally comprises an annular housing 25 coaxially positioned around the turbine shaft 14 and fixed for rotation therewith. The housing 25 further comprises an outer housing part 26 and an inner housing part 27 and, as shown in FIG. 1, the housing 26 also forms a compressor stub shaft for the turbine engine 12.

A bearing means 28 having an inner race 30, an outer race 32 and a rolling bearing element 34 rotatably journals a first axial end 36 of the housing 25 to the support housing 16. The outer bearing race is secured to the support housing 16 by suitable retainer means 38 while the inner bearing race 30 is secured to the housing 25 by a nut 40 which threadably engages the first end 36 of the housing 25.

The compressor disc 20 is secured to and extends radially outwardly from the other axial end 42 of the housing 25. A suitable labyrinth seal 44 sealingly connects the outer periphery of the housing 25 at a midpoint to the support housing 16 to isolate the bearing means 28 from the compressor air flow path 24. A lubrication jet 46, illustrated only diagrammatically, provides lubriation to the bearing means 28 in the conventional manner.

The inner housing part 27 is secured to the outer housing part 26 at each axial end by welds 50 or other suitable sealing means. Between the axial ends of the housing 25, however, the inner housing part 27 is spaced radially inwardly from the outer housing part 26 thus forming an axially extending, annular chamber 52, between the housing parts 26 and 27. The inner periphery 54 of the outer housing part 26, and thus the outer periphery of the annular chamber 52, tapers radially outwardly from the second end 42 of the housing 25 and toward the first end 36 for a reason to be subsequently described. The chamber 52 thus has an enlarged diameter end 51 and a reduced diameter end 53.

The annular chamber 52 is partly filled with a liquid coolant 56 through a fill hole 58 which is subsequently sealed by welding or other similar means. The coolant 56 can, for example, comprise water, fluorinated hydrocarbon (Freon), ethylene glycol or the like. Upon sealing the coolant fill hole 58, the annular chamber 52 is completely closed thus entrapping the coolant 56 within the chamber 52.

Figure 4:
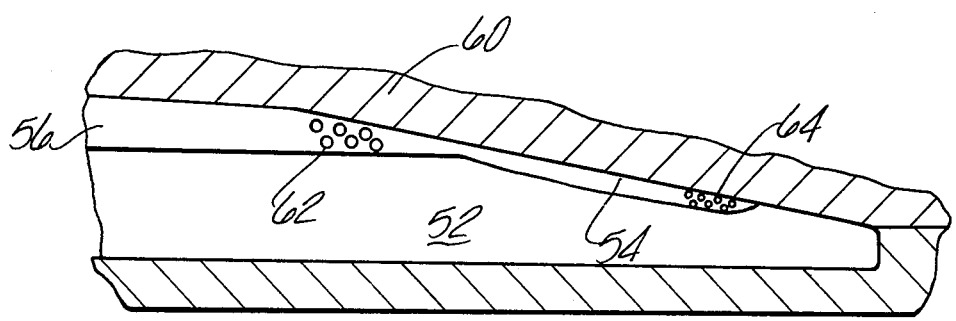
FIG. 4 is a fragmentary sectional view illustrating the operation of the device according to the present invention and with parts removed for clarity.

With reference now to FIGS. 1 and 4, upon rotation of the housing 25, the coolant 56 is centrifugally forced radially outwardly in the chamber 52 from the at rest position illustrated in FIG. 1 and to the configuration depicted in FIG. 4. Due to the taper of the inner periphery 54 of the first housing part 26, the coolant 56 is centrifugally pumped toward the first end 51 of the chamber 52. Upon continued operation of the turbine engine 12, and thus rotation of the housing 26 with respect to the support housing 16, friction heat from the bearing means 28 is conducted through the outer housing part 26 at 60 and to the coolant 56 which vaporizes as depicted at 62. The vaporized coolant 56 then expands towards the second end 53 of the chamber 52 and, by centrifugal force, impinges on the relatively cool inner periphery of the outer housing part 26 adjacent the compressor disc 20. In doing so, the vaporized coolant 62 transfers its heat energy to the outer housing part 26 and recondenses as shown at 64. The recondensed liquid 64 in turn is pumped by centrifugal force back toward the first end 51 of the chamber 52. The vaporization and recondensation of the coolant 56 within the chamber 52 is an ongoing and continuous process, eventually reaching an equilibrium between the liquid and vaporized coolant within the closed chamber 52.

The bearing heat which is transferred from the first end 36 to the second end 42 of the housing 25 is conducted via the compressor disc 20 to the compressor blades 22 which reject the heat into the compressor air flow path by convection. Consequently, the compressor stage 18 is effectively used as a heat sink for the bearing means 28 without the necessity of additional turbine engine components.

With reference now to FIG. 2, a modification of the invention is thereshown in which the bearing means 28 instead comprises a sleeve bearing 70 having its outer periphery 72 secured to the turbine engine support housing 16 by conventional means while the inner periphery 74 of the sleeve bearing 70 engages a machined surface 76 on the outer periphery of the outer housing part 26. A central lubricant hole 78 through the sleeve bearing 70 provides the necessary lubrication between the bearing and the housing part 26. The operation of the modification illustrated in FIG. 2 is identical to that of the embodiment shown in FIG. 1 and thus for brevity will not be repeated.

With reference now to FIG. 3, a still further modification of the present invention is thereshown in which the inner housing part 27 is instead replaced by a pair of annular end caps 80 and 82. One end cap 80 extends from the first end 36 of the outer housing part 26 and the second end cap 82 extends from the second axial end 42 of the outer housing part 26 thus forming an annular chamber 84 between the end caps 80 and 82 and the tapered inner periphery 54 of the outer housing part 26. The annular chamber 84, as before is partially filled with a liquid coolant and the operation of the modification depicted in FIG. 3 is identical to the embodiment shown in FIG. 1 and for brevity again will not be repeated. This modification is preferred when the housing 26 which forms the compressor stub shaft for the turbine engine 12 does not require the second turbine shaft 14 to pass coaxially and concentrically with the housing 26.

From the foregoing it can be seen that the present invention provides a novel bearing mounting with cooling means which is simple, inexpensive and light weight in construction and yet totally effective in operation. Moreover, when used in a turbine engine one or more compressor stages are advantageously employed as the heat sink for the bearing means 28, thus eliminating the bulk, weight and cost of an auxiliary heat sink.

It will be understood, however, that although the present invention has been disclosed and described for use in a turbine engine, no unnecessary limitations should be drawn therefrom. Rather, the bearing mounting with cooling means according to the present invention can be advantageously employed in other types of rotating systems where bearing cooling is required or desired.

Having described my invention, many modifications thereto will become apparent to those skilled in the art to which it pertains without deviation from the spirit of the invention as defined by the scope of the appended claims.

I claim:
1. A mounting for a bearing means comprising:
 a housing coaxially connected to a rotating shaft means;
 bearing means being operatively disposed between a relatively stationary member and a first axial end of said housing;
 heat sink means connected to the other axial end of said housing; and
 fluid passage means extending between said ends of said housing, said fluid passage means including an annular outer wall portion which tapers radially inwardly from the first end of said housing to the second end of said housing, said fluid passage means being at least partly filled with a liquid.

2. The invention as defined in claim 1 wherein said housing further comprises a first annular part and a second annular part, said parts being coaxially secured together at each axial end so that one part is spaced radially from the other part to thereby form an annular chamber therebetween, said annular chamber forming at least a portion of said fluid passage means.

3. The invention as defined in claim 1 wherein said relatively stationary member is a support housing of a turbine engine and wherein said heat sink means comprises a compressor stage of said turbine engine.

4. The invention as defined in claim 1 wherein said housing is tubular and is positioned coaxially around a second shaft means.

5. The invention as defined in claim 1 wherein said housing further comprising a pair of end caps between which said fluid passage means is formed.

6. The invention as defined in claim 1 wherein said bearing means includes a roller bearing element positioned between an inner and outer bearing race.

7. The invention as defined in claim 6 wherein one bearing race is formed about the periphery of the housing.

8. The invention as defined in claim 1 wherein said bearing means comprises a tubular sleeve positioned between the stationary member and the housing.

9. The invention as defined in claim 3 wherein said compressor stage further includes a compressor disc coupled to said second end of said housing, said disc having a plurality of compressor blades attached about its outer periphery and positioned in an air flow path of the turbine engine whereby heat from the housing is conducted to the compressor blades by the disc and is rejected into the air flow path.

10. The invention as defined in claim 1 wherein said liquid is water.

11. The invention as defined in claim 1 wherein said liquid is a fluorinated hydrocarbon.

12. The invention as defined in claim 1 wherein said liquid is ethylene glycol.

* * * * *